(12) United States Patent
Tanaka

(10) Patent No.: US 6,314,245 B1
(45) Date of Patent: Nov. 6, 2001

(54) CAMERA HAVING PICTURE SIZE SWITCHING FUNCTION AND/OR TO DATA PROJECTING FUNCTION

(75) Inventor: Nobuyuki Tanaka, Hidaka (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/200,209

(22) Filed: Nov. 25, 1998

(30) Foreign Application Priority Data

Dec. 1, 1997 (JP) .................................................. 9-330440
Jan. 7, 1998 (JP) ................................................ 10-001748

(51) Int. Cl.⁷ .................................................. G03B 17/24
(52) U.S. Cl. ........................... 396/315; 396/435; 396/541
(58) Field of Search ..................................... 396/310, 315, 396/317, 378, 380, 435, 436, 541

(56) References Cited

U.S. PATENT DOCUMENTS

| 5,086,311 | * | 2/1992 | Naka et al. | 396/436 |
| 5,477,293 | * | 12/1995 | Osakabe | 396/435 |
| 5,583,592 | * | 12/1996 | Kata et al. | 396/318 |
| 5,678,100 | * | 10/1997 | Nakamura | 396/435 |
| 5,892,993 | * | 4/1999 | Moriya | 396/317 |
| 5,933,663 | * | 8/1999 | Kikuchi | 396/315 |
| 6,023,592 | * | 2/2000 | Yokoyama et al. | 396/541 |

FOREIGN PATENT DOCUMENTS

| 6-110123 | 4/1994 | (JP) . |
| 6-180465 | 6/1994 | (JP) . |
| 6-250279 | 9/1994 | (JP) . |

\* cited by examiner

*Primary Examiner*—David M. Gray
(74) *Attorney, Agent, or Firm*—Volpe & Koenig, P.C.

(57) ABSTRACT

A camera consists of a lens barrel unit, a spool chamber unit, a Patrone chamber unit, and a substantially plate-like linking member. The linking member has a photographic aperture, and guide rails for restricting the position of a film relative to the photographic aperture. The linking member links the spool chamber unit and Patrone chamber unit. A picture size switching mechanism realizing a picture size switching function for partly blocking the photographic aperture is mounted on the linking member. The camera further includes a viewfinder picture size switching mechanism for switching viewfinder picture sizes, and a switching control unit for controlling the photographic picture size switching mechanism and viewfinder picture size switching mechanism so that a photographic picture zone and viewfinder picture zone will be set to the same picture size. After the viewfinder picture zone is switched from a large picture size to a small picture size, the photographic picture zone is wider than a field of view defined as the viewfinder picture zone.

15 Claims, 9 Drawing Sheets

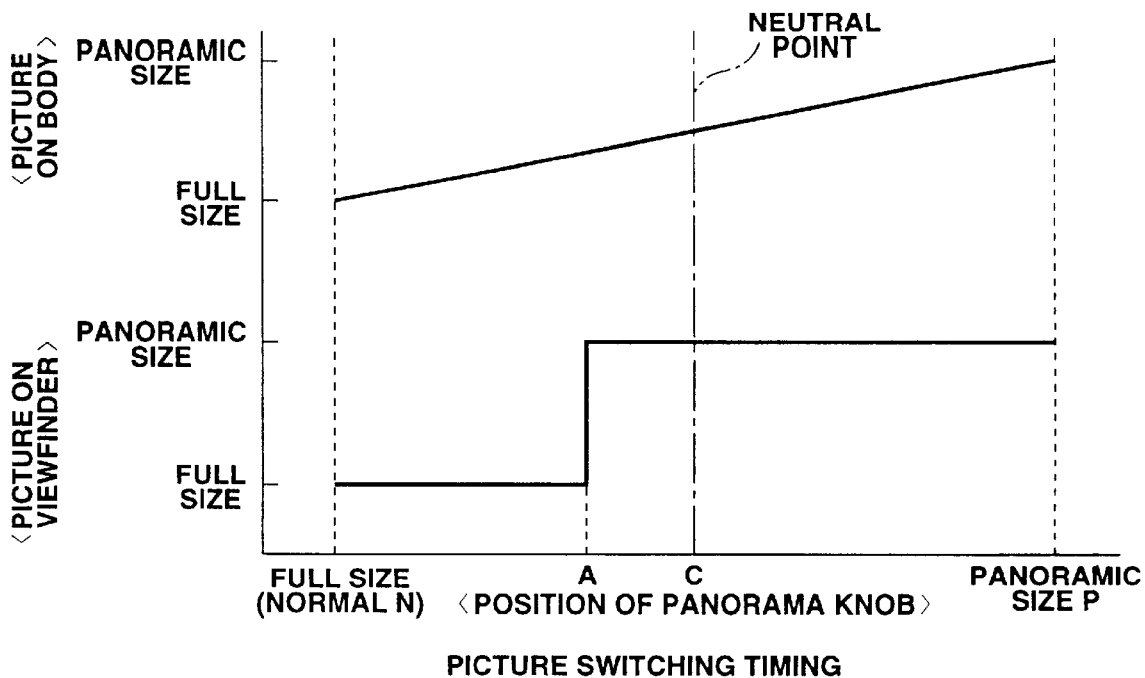
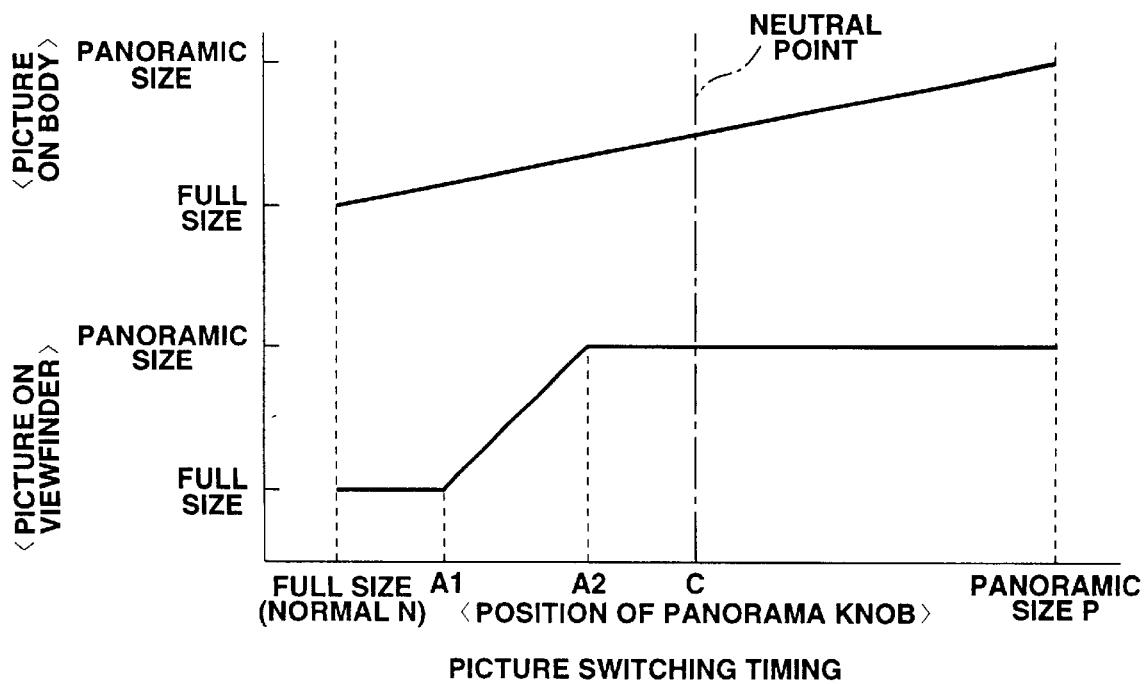

CAMERA HAVING PICTURE SIZE SWITCHING FUNCTION AND/OR TO DATA PROJECTING FUNCTION

BACKGROUND OF THE INVENTION

1. Field of the Invention

The present invention relates to a camera. More particularly, this invention is concerned with a camera having a picture size switching function for partly blocking a photographic aperture to a desired size and thus switching picture sizes, and/or a data projecting function for projecting data on a film.

2. Description of the Related Art

In the past, various proposals have been made of a compact camera (hereinafter simply a camera) for carrying out photography using a rolled photography film having a width of 35 mm. The camera has a photographic picture size switching mechanism for switching between a normal photographic picture size (approximately 36 mm×approximately 24 mm) and a size different from the normal photographic picture size, for example, a sideways long panoramic picture size (approximately 36 mm×approximately 12 mm). Herein, the panoramic picture size is attained by partly blocking a photographic aperture. Moreover, the camera has a viewfinder picture size switching mechanism that is interlocked with the photographic picture size switching mechanism. The viewfinder picture size switching mechanism switches the size of a field of view permissible by a viewfinder, through which an object image is viewed, to another size, that is, switches viewfinder picture sizes. Such a camera has been put to use in general practice.

For example, a camera that has been disclosed in Japanese Unexamined Patent Publication No. 6-250279 is a camera capable of switching photographic picture sizes. A rotatable axis capable of freely rotating lies near a photographic aperture. When the axis rotates in a given direction, a string-like member that links a light intercepting member and the axis is wound about the axis. Herein, the light intercepting member moves to a position, at which the photographic aperture is partly blocked, or a position, at which it has withdrawn from the photographic aperture, and thus designates a given photographic picture size.

The light intercepting member is moved against a constraining force of a constraining means for constraining the light intercepting member to move in a direction in which the given photographic picture size is attained. Thus, photographic picture sizes are switched.

The picture size switching mechanism is located in a so-called dead space in a spool chamber in which a rolled film that has been exposed is stowed. Thus, the space in the camera is utilized effectively. Eventually, a compact camera is realized.

Moreover, a camera that has been disclosed in Japanese Unexamined Patent Publication No. 6-110123 includes a photographic picture size switching mechanism and a liquid crystal display. The photographic picture size switching mechanism partly blocks a photographic aperture by mechanically driving a mask member located in a camera body using a driving force exerted by a motor or the like, and thus selects a desired picture size. The liquid crystal display is included in a viewfinder and is capable of changing the transmittance of a partial area thereof. The camera further includes a viewfinder picture size switching mechanism. After the transmittance of the given area of the liquid crystal display is changed, the viewfinder picture size switching mechanism is controlled so that a viewfinder picture zone will match a photographic picture zone defined by the photographic picture size switching mechanism.

A camera that has been disclosed in Japanese Unexamined Patent Publication No. 6-180465 has, similar to the one disclosed in the Japanese Unexamined Patent Publication No. 6-110123, a photographic picture size switching mechanism and a liquid crystal display. The photographic picture size switching mechanism partly blocks a photographic aperture using a mask member, and switches the size of a photographic picture zone to a given picture size providing a different aspect ratio. The liquid crystal display can change the state of a given area thereof to a transparent state or opaque state. The camera further includes a viewfinder picture size switching mechanism. When the given area of the liquid crystal display is brought to the transparent state or opaque state, the viewfinder picture size switching mechanism provides a viewfinder picture zone matching a photographic picture zone defined by the photographic picture size switching mechanism.

However, according to the means disclosed in the Japanese Unexamined Patent Publication No. 6-250279, the thickness of the camera body (dimension in an optical-axis direction of a photographic lens) gets larger. This poses a problem that the camera itself becomes large.

Moreover, in the Japanese Unexamined Patent Publications Nos. 6-110123 and 6-180465, a means disclosed drives the viewfinder picture size switching mechanism so that the viewfinder picture size switching mechanism will be interlocked with the photographic picture size switching mechanism. No mention is made of a mask member for partly blocking the photographic aperture and of the timing of driving the viewfinder picture size switching mechanism. Herein the viewfinder picture size switching mechanism is driven in order to change the transmittance of the given area of the liquid crystal display in the viewfinder or to block the given area.

Assume that the means that has been disclosed in the Japanese Unexamined Patent Publication No. 6-110123 or 6-180465 is used to switch the sizes of the photographic picture zone and viewfinder picture zone. In this case, for example, a handling member supposed to be handled by an operator in order to switch photographic picture sizes may be handled halfway. The operator may be unaware of this fact and start taking a picture. Thus, the handling member may be halted halfway. In this case, the picture size specified with the photographic aperture by the photographic picture size switching mechanism may disagree with the picture size specified with a viewfinder field of view by the viewfinder picture size switching mechanism.

A conceivable means for solving the foregoing problems is to optimize the switching operations performed by the switching mechanisms in consideration of the timing of driving the photographic picture size switching mechanism and viewfinder picture size switching mechanism.

On the other hand, conventional cameras using a rolled photographic film and having a data projecting function have been put to practical use. Herein, the data projecting function optically projects various items of photographic information (data), for example, a date of photography and a time instant of photography in the form of characters at a given position within a photographic picture zone on a film loaded in a camera or in a given area outside the photographic picture zone.

For example, a camera has a camera body made by uniting a unit forming a spool chamber, a unit forming a Patrone chamber or film cartridge chamber, and a linking member. The linking member is composed of a photographic aperture, through which a light beam coming from a photographic lens is transmitted, and guide rails for restricting the position of a film relative to the photographic aperture. A unit composed of members for realizing the data projecting function is located in a so-called dead space near the junction between the spool chamber (or Patrone chamber) and linking member.

Furthermore, various proposals have been made of a camera in which both the data projecting function and picture size switching function are realized. Such cameras have been put to use in general practice.

However, as mentioned above, the conventional cameras have the spool chamber unit, Patrone chamber unit, and linking member for linking the units united. The unit for realizing the data projecting function is located in a relatively narrow space (dead space) near the junction between the spool chamber unit (or Patrone chamber unit) and linking member. This poses a problem in assembling components in the course of manufacturing. After assembling is completed, it becomes hard to check movements for the function. Thus, there is an underlying problem of strict quality management.

Moreover, assume that the means that has been disclosed in the Japanese Unexamined Patent Publication No. 6-250279 is used to realize both the data projecting function and picture size switching function. In this case, the number of components needed to realize these functions increases. It is hard to stow the components in a limited space in the camera body. For stowing numerous components, a space to be occupied by the components must be preserved. This leads to a problem that the camera itself gets larger.

Moreover, in this case, it is necessary to switch from a given position at which data is projected to another along with the movements for switching photographic picture sizes. For interlocking the data projecting function with the picture size switching function, the structures for realizing the functions get more complex. This poses a problem that the efficiency in assembling components in the course of manufacturing, and the cost for quality management or manufacturing are adversely affected.

SUMMARY OF THE INVENTION

A first object of the present invention is to provide a camera capable of switching picture sizes, and having a photographic picture size switching mechanism and viewfinder picture size switching mechanism. Herein, the photographic picture size switching mechanism partly blocks a photographic aperture and switches photographic picture sizes. The viewfinder picture size switching mechanism defines a viewfinder picture zone that matches a photographic picture zone selected by the photographic picture size switching mechanism. In the camera, a scene within at least a field of view permissible by a viewfinder can be photographed reliably.

Moreover, a second object of the present invention is to provide a camera in which a mechanism (unit) realizing a data projecting function and a mechanism (unit) realizing a picture size switching function are united. Thus, the functions are realized and interlocked with each other by causing the mechanisms to make simpler movements. Herein, the data projecting function projects data onto a film. The picture size switching function blocks a photographic aperture to a desired size. The space in the camera is saved, thus contributing to realization of a compact camera.

A third object of the present invention is to provide a camera in which the foregoing units are arranged properly in a camera body. Assembling or transporting components in the course of manufacturing a camera is thus facilitated. Consequently, the cost of manufacturing is minimized.

Briefly, according to the present invention, a camera consists of a lens barrel unit, a spool chamber unit, a Patrone chamber unit, and a substantially plate-like linking member. The spool chamber unit forms a spool chamber. The Patrone chamber unit forms a Patrone chamber. The linking member has a photographic aperture through which a light beam coming from the lens barrel unit passes, and guide rails for restricting the position of a film relative to the photographic aperture. The linking member links the spool chamber unit and Patrone chamber unit. A picture size switching mechanism realizing a picture size switching function for blocking the photographic aperture to a desired size and/or a data projecting unit realizing a data projecting function for projecting data onto a film are mounted on the liking member.

The foregoing objects and other objects of the present invention and the advantages thereof will be apparent from the description below.

According to the present invention, there is provided a camera capable of switching picture sizes which has a photographic picture size switching mechanism and a viewfinder picture size switching mechanism. Herein, the photographic picture size switching mechanism partly blocks a photographic aperture and switches photographic picture sizes. The viewfinder picture size switching mechanism that is interlocked with the photographic picture size switching mechanism defines a viewfinder picture zone matching the photographic picture zone selected by the switching mechanism. Using the camera, a scene within a field of view permissible by a viewfinder can be photographed reliably.

Moreover, a mechanism realizing a data projecting function for projecting data onto a film and a mechanism realizing a picture size switching function for blocking a photographic aperture to a desired size are united. Thus, the functions are realized and interlocked with each by causing the mechanisms to make simpler movements. Consequently, space saving can be achieved. This contributes to realization of a compact camera.

When the units are arranged properly in a camera body, assembling and transporting components in the course of manufacturing a camera are facilitated. Furthermore, the cost of manufacturing is minimized.

BRIEF DESCRIPTION OF THE DRAWINGS

FIG. 9 is a timing chart for explaining the timing of moving a light intercepting plate in a data projecting unit in the camera shown in FIG. 1, and the timing of moving an LCD for defining a viewfinder field of view included in a picture size switching mechanism;

FIG. 11 is a timing chart for explaining the timing of moving a light intercepting plate in the data projecting unit shown in FIG. 10 and the timing of moving a viewfinder light intercepting member for restricting a viewfinder field of view included in the picture size switching mechanism.

DESCRIPTION OF THE PREFERRED EMBODIMENTS

Figure 1:
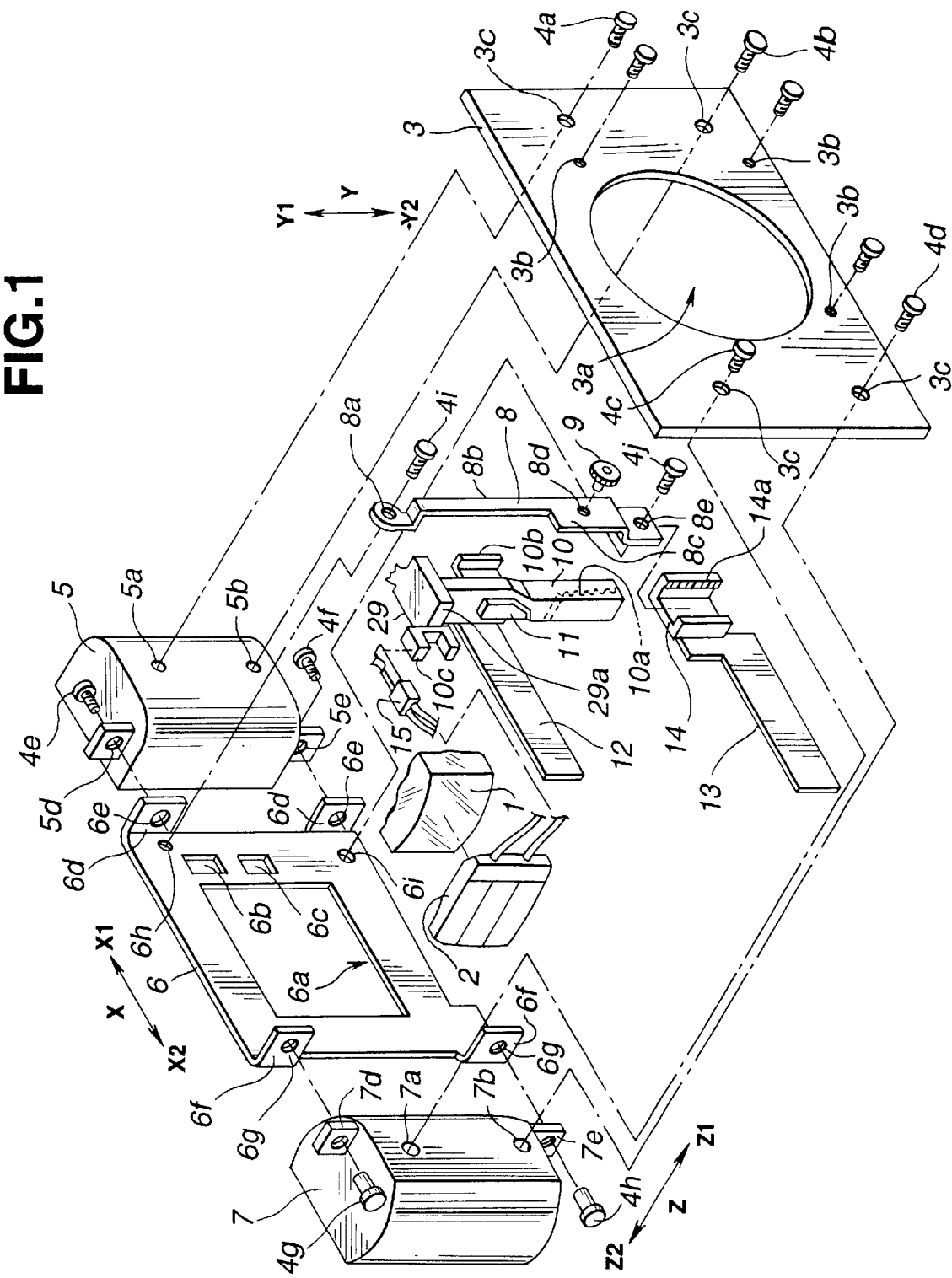
FIG. 1 is an exploded oblique view showing a camera body of a camera in accordance with a first embodiment of the present invention.
Figure 2:
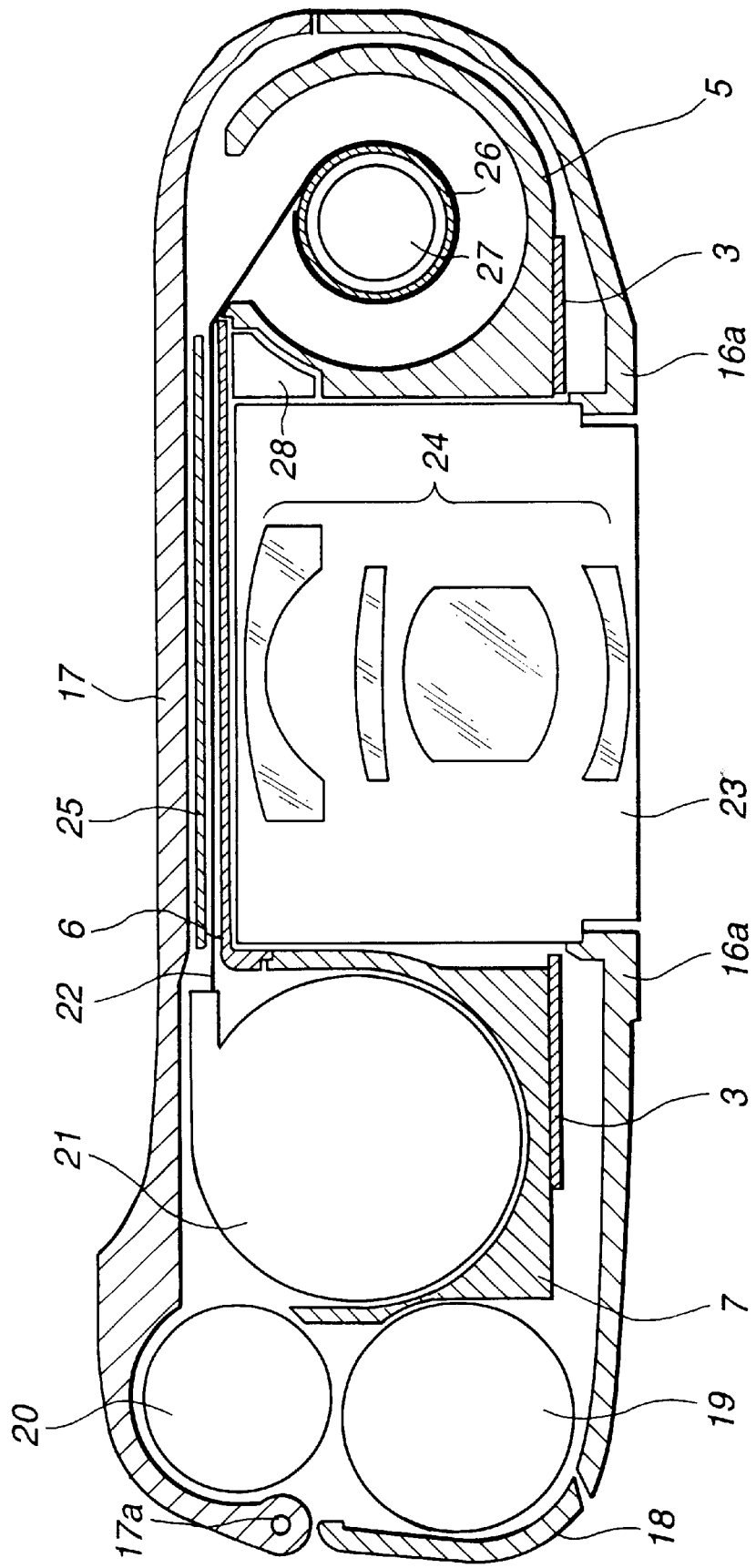
FIG. 2 is a cross sectional view of substantially a center portion of the camera shown in FIG. 1 and seen from the top thereof.
Figure 3:
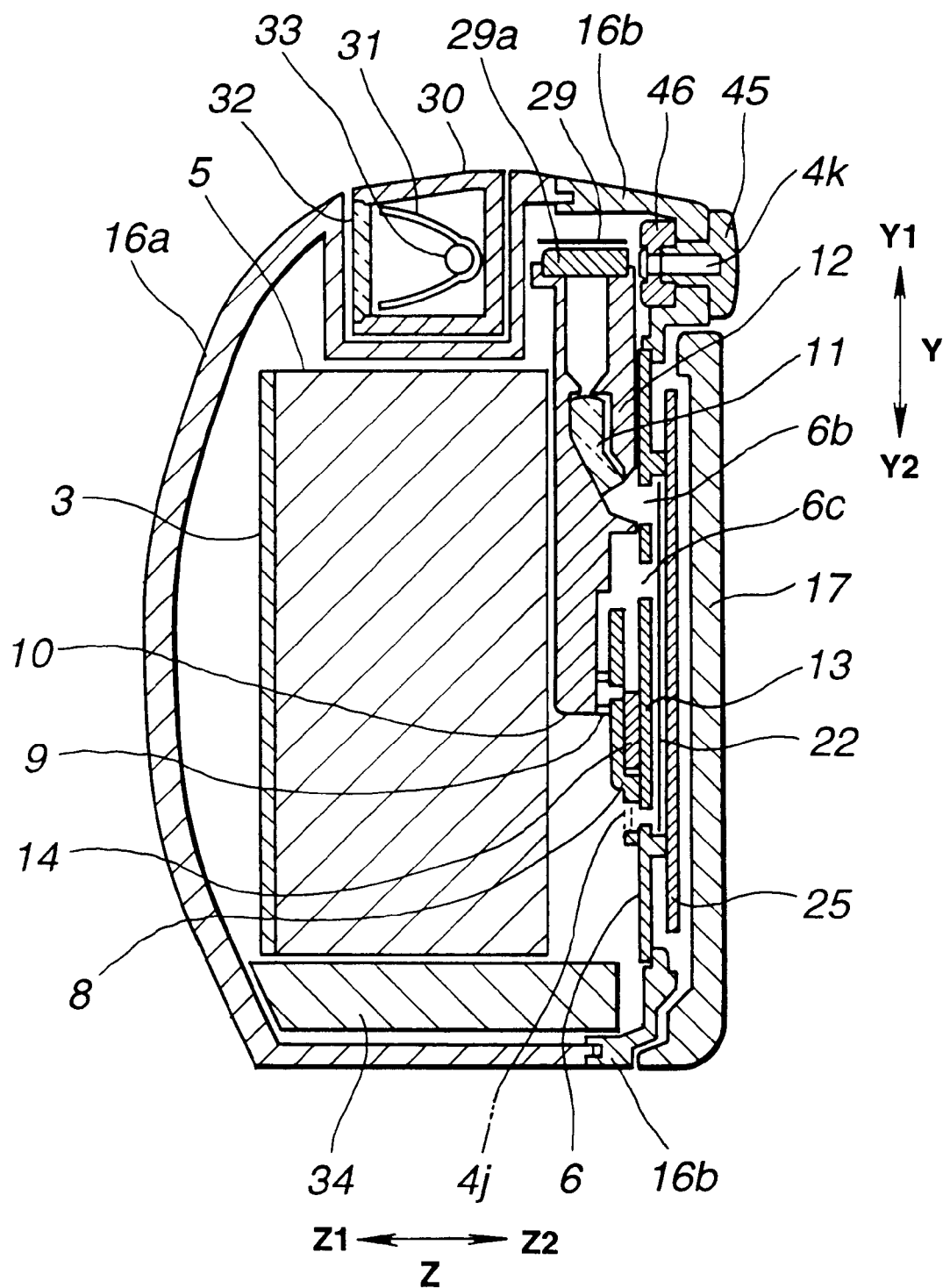
FIG. 3 is a longitudinal sectional view of components located near a spool chamber unit in the camera shown in FIG. 1 and seen from a side thereof, wherein a picture size switching mechanism is set to designate a normal picture size.
Figure 4:
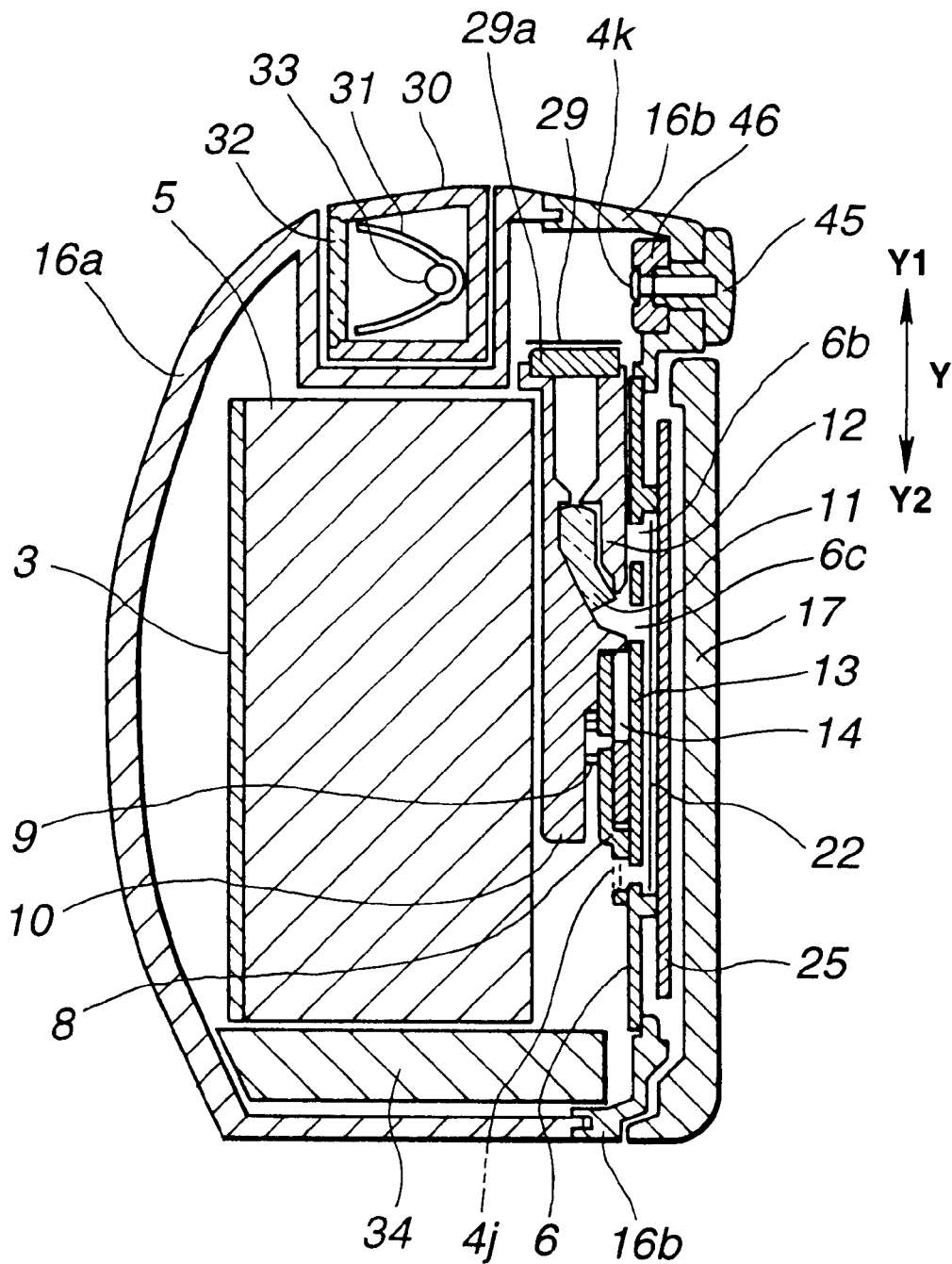
FIG. 4 is a longitudinal sectional view of components located near the spool chamber unit in the camera shown in FIG. 1 and seen from the side thereof, wherein the picture size switching mechanism is set to designate a panoramic picture size.
Figure 5:
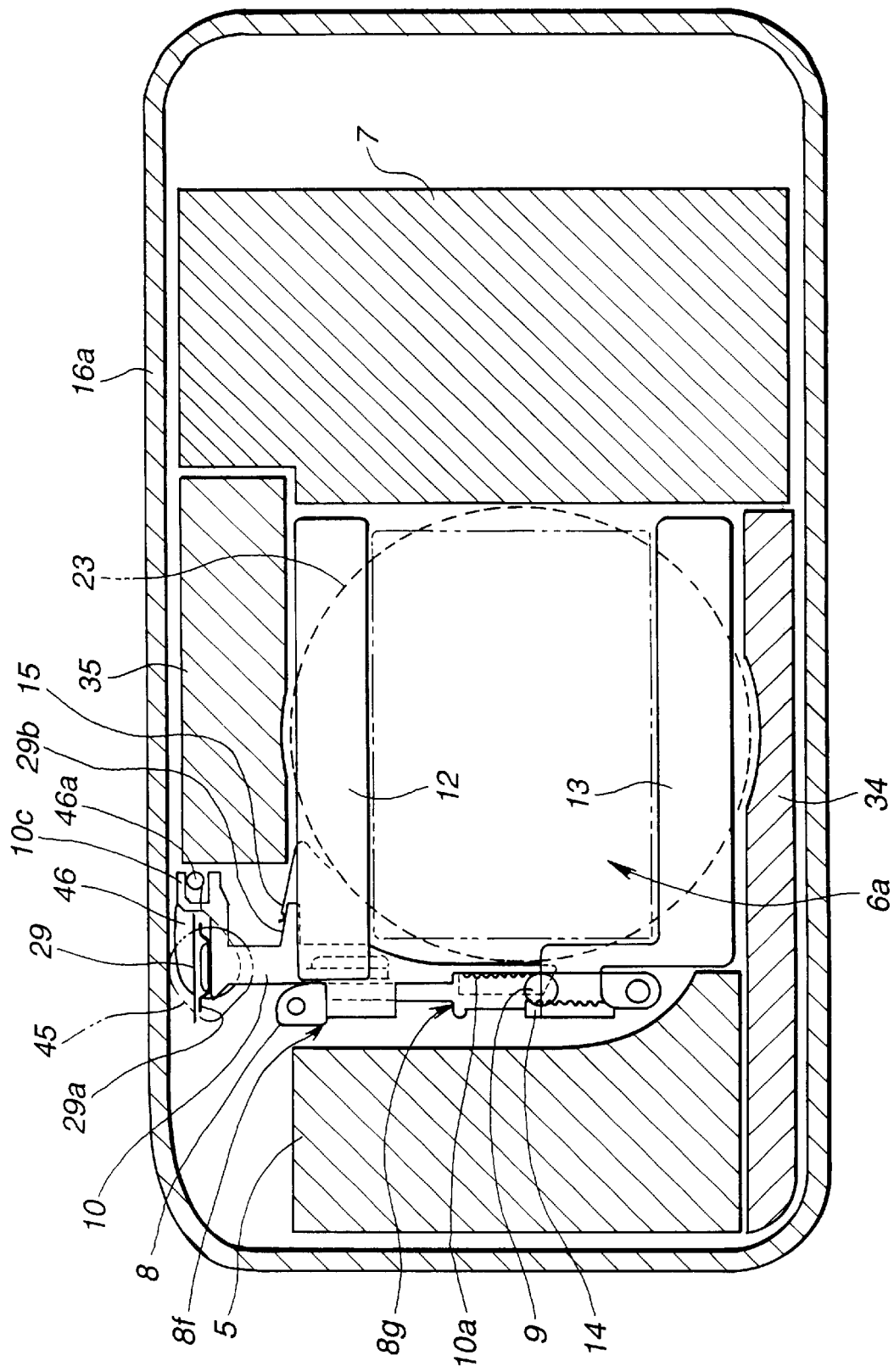
FIG. 5 is a longitudinal sectional view of substantially the center portion of the camera shown in FIG. 1 and seen from the back thereof, wherein the picture size switching mechanism is set to designate the normal picture size.
Figure 6:
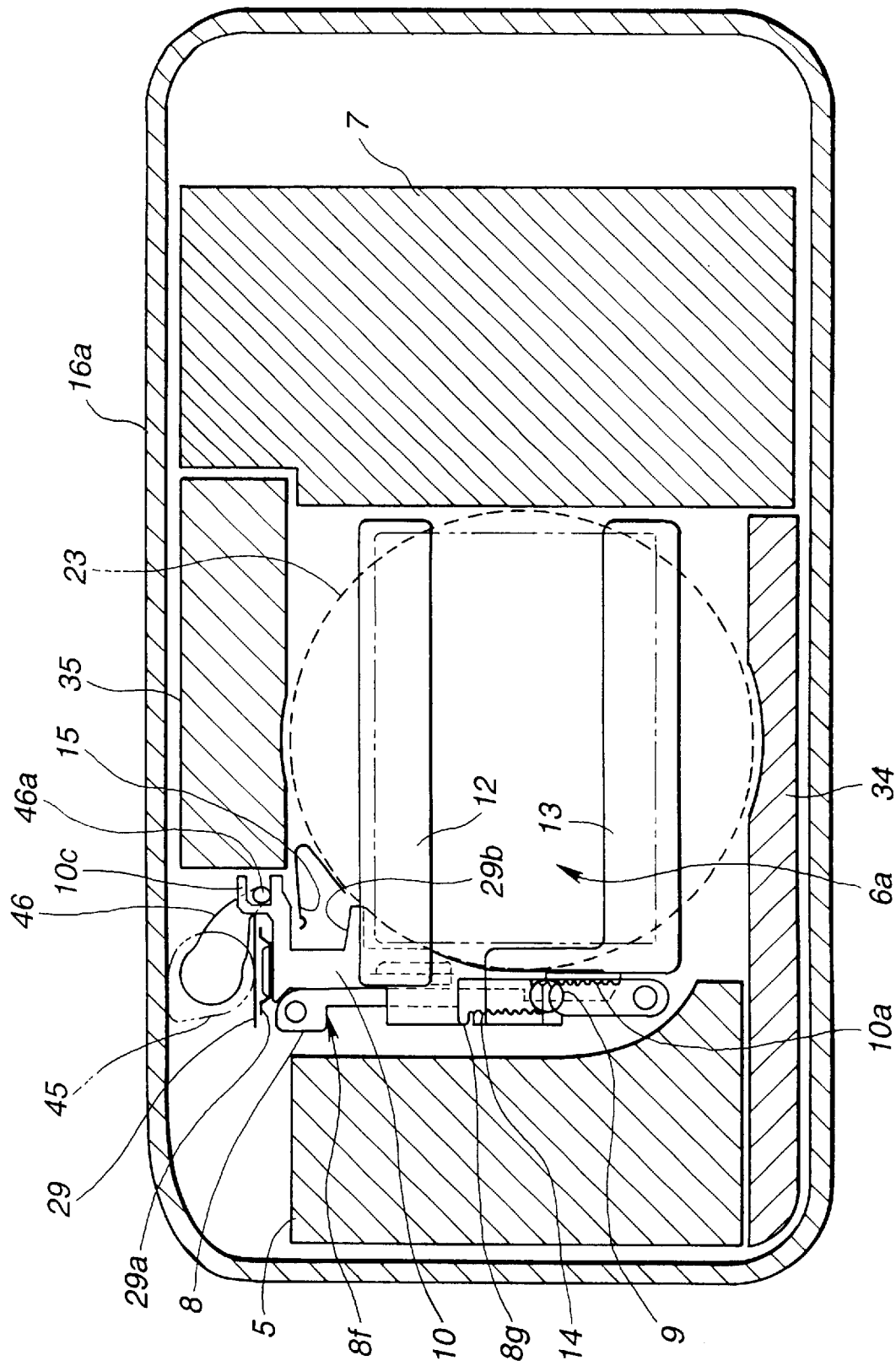
FIG. 6 is a longitudinal sectional view of substantially the center portion of the camera shown in FIG. 1 and seen from the back thereof, wherein the picture size switching mechanism is set to designate the panoramic picture size.

FIG. 1 is an exploded oblique view showing a camera body of a camera in accordance with the first embodiment of the present invention. FIG. 2 is a cross sectional view showing substantially a center portion of the camera from the top thereof. FIGS. 3 and 4 are longitudinal sectional views of components located near a spool chamber unit in the camera seen from a side thereof. FIGS. 3 and 4 show two forms of a picture size switching mechanism (forms designating a normal picture size and panoramic picture size). FIGS. 5 and 6 are longitudinal sectional views of substantially the center of the camera seen from the back thereof. FIGS. 5 and 6 show two forms of the picture size switching mechanism (forms designating the normal picture size and panoramic picture size corresponding to those in FIGS. 3 and 4).

A camera body of the camera of this embodiment consists of, as shown in FIGS. 1 and 2, a spool chamber unit 5, a Patrone chamber unit 7 (also referred to a cartridge chamber unit. The term "Patrone chamber unit" will be adopted herein), a lens barrel unit 23, a linking member 6, a linkage reinforcing member 3, and a lower linking member (not shown). Specifically, the spool chamber unit 5 forms a spool chamber in which a spool 26 about which a rolled film (hereinafter simply a film) 22 that has been exposed is wound is located so that the spool can rotate freely. The Patrone chamber forms a Patrone chamber (which may be referred to as a cartridge chamber. The term "Patrone chamber" will be adopted herein.) in which a film Patrone (which may be referred to as a film cartridge. The term "film Patrone" will be adopted herein.) 21 is loaded. The lens barrel unit 23 holds a group of photographic lenses 24 therein. The linking member 6 is shaped substantially like a flat plate, has a photographic aperture 6a and guide rails (not shown), and links the spool chamber unit 5, Patrone chamber unit 7, and lens barrel unit 23. The linkage reinforcing member 3 is shaped substantially like a flat plate for reinforcing linkage of the units on the side of the face of the camera body. The lower linking member is a linking member shaped substantially like an elongated flat plate for reinforcing the linkage of the units on the side of the bottom of the camera body.

The linking member 6 has, as mentioned above, at least the photographic aperture 6a bored substantially in the center thereof. Moreover, the guide rails are formed on the back of the linking member 6. The photographic aperture 6a passes a light beam coming from the lens barrel unit 23 and serves as a picture frame. The guide rails cooperate with a platen 25 formed on a back lid 17 of the camera in pressing both edges of a film 22 in the width direction thereof to ensure evenness for the film 22. Furthermore, the guide rails fill the role of restricting the position of the film relative to the photographic aperture 6a in the camera.

Substantially in the center of the linkage reinforcing member 3, there is an opening 3a having substantially the same dimension as the outer diameter of the lens barrel unit 23. Three through holes 3b used to mount the lens barrel unit on the linking reinforcing member 3 are bored at given positions on the perimeter of the opening 3a. The lens barrel unit 23 and linkage reinforcing member 3 are thus screwed together through the holes.

Moreover, two through holes 3c are bored on each of the side edges of the linkage reinforcing member 3 and used to fix the linkage reinforcing member 3 to the spool chamber unit 5 and Patrone chamber unit 7. The spool chamber unit 5 and Patrone chamber unit 7 are thus fixed to both side edges of the linkage reinforcing member 3 using screws 4a, 4b, 4c, and 4d.

The lens barrel unit 23 is shaped substantially like a cylinder. The photographic lens 24 and others are, as mentioned above, held in the lens barrel unit 23 (See FIG. 2). Ribs having screw holes (not shown) bored at given positions coincident with the through holes 3c are formed as integral parts of the lens barrel unit 23 in the center of the outer circumference thereof.

Moreover, a barrel attachment (not shown) shaped substantially like a flat plate is united with the back end of the lens barrel unit 23. An opening having substantially the same dimension as the outer diameter of the lens barrel unit 23 is bored substantially in the center of the barrel attachment. A screw hole (not shown) used to fix the linking member 6 to the barrel attachment is bored at four corners of the barrel attachment.

The linking member 6 has bends 6d and 6f formed by bending parts of both short-side edges of the linking member 6 substantially perpendicularly forward. One pair of bends 6d have bores 6e formed in order to fix the linking member 6 to the spool chamber unit 5. The other pair of bends 6f have bores 6g formed in order to fix the linking member 6 to the Patrone chamber unit 7. The photographic aperture 6a is bored substantially in the center of the linking member 6, thus defining a picture frame.

Moreover, in the face of the spool chamber unit 5, two screw holes 5a and 5b are bored to be opposed to associated ones of the through holes 3c. The screw holes 5a and 5b are used to fix the spool chamber unit 5 to the linking reinforcing member 3.

Two linkages having screw holes 5d and 5e are jutted out of the top and bottom of the spool chamber unit 5. The screw holes 5d and 5e are used to fix the spool chamber unit 5 to the linking member 6. The spool chamber unit 5 is fixed to the linking member 6 by tightening screws 4e and 4f inserted in the screw holes 5d and 5e. Furthermore, two screw holes (not shown) are bored in the bottom of the spool chamber unit 5, and used to hold the spool chamber unit 5 on the lower linking member (not shown).

Similar to the spool chamber unit 5, in the face of the Patrone chamber unit 7, two screw holes 7a and 7b are bored to be opposed to associated ones of the through holes 3c. The screw holes 7a and 7b are used to fix the Patrone chamber unit 7 to the linking reinforcing member 3. Two linkages having screw holes 7d and 7e respectively are jutted out of the top and bottom of the Patrone chamber unit 7. The screw holes 7d and 7e are used to fix the Patrone chamber unit 7 to the linking member 6. The Patrone chamber unit 7 is thus fixed to the linking member 6 by tightening screws 4g and 4h inserted in the screw holes 7d and 7e. Furthermore, two screw holes (not shown) are bored in the bottom of the Patrone chamber unit 7, and used to hold the Patrone chamber unit 7 on the lower linking member (not shown).

By the way, on the inside surface of the linking member 6, a data projecting unit and a picture size switching mechanism are mounted as a unit. Herein, the data projecting unit realizes a function for optically projecting data of date information in the form of characters or symbols within a photographic picture onto the film 22 during photography. The date information includes a date of photography and a time instant of photography. The picture size switching mechanism that is a photographic picture size switching means realizes a function for blocking the photographic aperture 6a to a desired size and thus switching one dimension of the aperture defining a photographic picture zone to another.

The data projecting unit consists of a flexible printed-circuit board (FPC) 29, a holding member 10, and a guide plate 8. The FPC has a light emitting diode (LED) 29a mounted thereon. The holding member 10 has the FPC 29 bonded thereon. The guide plate 8 holds the holding member 10 so that the holding member can slide freely along one side edge of the face of the linking member 6.

A prism 11 is bonded onto the middle part of the holding member 10. The prism 11 introduces a light beam emanating from the LED 29a on the FPC 29 to the surface of the film 22. Also bonded thereon is an upper light intercepting plate 12 for blocking the upper part of the photographic aperture 6a along a long side thereof. A guide member 10b is jutted out of the middle part of the holding member 10. The guide member 10b guides the holding member 10 to slide in the direction of arrow Y in FIG. 1. The guide member 10b is engaged with a slideway 8b of the guide plate 8 so that the guide member 10b can slide freely.

Moreover, an arm member 10c shaped like a channel and opening inward is located on the top of the holding member 10. A handling member (rotary knob or panorama knob) 45 that is an external handling member used to switch picture sizes is borne by the arm member 10c so that the handling member can be turned. Moreover, a work shaft 46a of a work lever 46 that turns together with the handling member 45 is clamped by the arm member 10c. The handling member 45 serves as a driving force applying member for applying a driving force used to switch photographic picture sizes.

On the top of the holding member 10, a picture size detection switch 15 is placed to extend along a trajectory along which the holding member 10 moves (in the direction of arrow Y in FIG. 1). The picture size detection switch 15 serves as a detecting means for detecting the fact that picture sizes have been switched, and as an output means for outputting a detection signal indicating the fact. The picture size detection switch 15 is a switching means realized with a switch or the like. Owing to the picture size detection switch 15, it can be detected whether a photographic picture size is a normal size (approximately 36 mm×approximately 24 mm) or a panoramic size (approximately 36 mm×approximately 12 mm).

Furthermore, on the lower part of the holding member 10, a rack 10a is formed to face outward. The rack 10a meshes with a pinion gear 9 pivoted into a hole 8d, which is bored in a wider part 8c of the guide plate 8, so that the pinion gear can rotate freely.

A lower light intercepting plate holding member 14 shaped like a channel is engaged with the wider part 8c of the guide plate 8. A rack 14a is formed on one inner wall surface of the lower light intercepting plate holding member 14. The rack 14a is meshed with the pinion gear 9. A lower light intercepting plate 13 for blocking the lower part of the photographic aperture 6a along a long side thereof is bonded to the planar part of the back of the lower light intercepting plate holding member 14.

The holding member 10 and lower light intercepting plate holding member 14 are mounted on the linking member 6 with the rack 10a, pinion gear 9, and rack 14a meshed with one another and integrated into the guide plate 8. Specifically, through holes 8a and 8e are bored at the upper end and lower end of the guide plate 8. Screws 4i and 4j are inserted in screw holes 6h and 6i of the linking member 6 via the through holes 8a and 8e and then tightened. Thus, the assembly is mounted on the linking member 6. The photographic picture size switching means is thus structured.

Two openings through which a light beam emanating from the LED 29a is irradiated to the surface of the film 22 are bored at positions in the side of the linking member 6 opposed to the holding member 10. Specifically, there is an opening 6b associated with the normal photographic picture size, and an opening 6c associated with the panoramic photographic picture size.

Moreover, a liquid crystal display (hereinafter LCD) 2 located near the image plane of a viewfinder prism 1 that is included in a viewfinder unit is electrically coupled to the picture size detection switch 15. The LCD 2 serves as a viewfinder light intercepting member for defining a viewfinder picture zone by partly blocking a range visible through a viewfinder (hereinafter referred to as a viewfinder field of view). The LCD 2 also serves as a viewfinder picture indicator and display. The viewfinder field of view defined by the LCD 2 is restricted to a range matching the photographic aperture 6a. The LCD 2 is driven in response to a detection signal (output signal) sent from the picture size detection switch 15. A viewfinder picture size switching means for indicating a given viewfinder picture size is thus structured.

In other words, the LCD 2 includes a first instructing means (first display means) and a second instructing means (second display means). The first instructing means uses a control circuit and LCD drive circuit in the camera (See FIG. 7 that will be referenced later) to bring the whole picture zone to a transparent state. The first instructing means thus indicates that the normal picture size (normal size or first size) has been attained. The second instructing means brings a given range of the picture zone to a light-intercepted state, and thus indicates that the panoramic picture size (panoramic size or first size) has been attained. FIG. 1 shows a state in which the panoramic picture size is detected and the given range is light-intercepted.

The thus structured camera body has the lens barrel unit 23, which holds the photographic lens 24, located substantially in the center thereof. The spool chamber unit 5 and Patrone chamber unit 7 are located at opposite ends of the camera body with the lens barrel unit 23 between them.

The spool 26 about which the film 22 is wound is located in the spool chamber unit 5. A driving motor 27 for driving a film feed and lens barrel unit is incorporated in the spool 26. Moreover, the Patrone 21 is loaded in the Patrone chamber unit 7. The film 22 pulled out of the Patrone 21 is passed through a film feed path defined inside the back lid 17 between the platen 25 and the linking member 6 in the camera body. The film 22 is then wound about the spool 26.

Located near the Patrone chamber unit 7 are a strobe capacitor 20 and a supply battery 19. As shown in FIGS. 2, 3, and 4, the assembly of the component members and camera body has the face thereof and the front upper and lower parts thereof covered with a front housing member 16a. The back upper and lower parts of the assembly are covered with a back housing member 16b. The back of the assembly is covered with the back lid 17 pivoted by an axis 17a so that the back lid 17 can pivot freely. The back of the camera body is thus freely opened or closed. As shown in FIG. 2, a battery lid 18 is formed on one side of the camera body to be opened or closed freely. The supply battery 19 can be dismounted through the battery lid 18.

The data projecting unit and picture size switching mechanism composed of the holding member 10, lower light intercepting plate holding member 14, and guide plate 8 are located efficiently in a space 28 defined by the spool chamber unit 5 and lens barrel unit 23.

Moreover, as shown in FIGS. 3 and 4, a strobe unit 30 is located on one edge on the top of the camera. The strobe unit 30 composed of a reflector 31, a diffusing plate 32, and a flash lamp 33 such as a xenon lamp can be jutted out freely by a mechanism that is not shown. The strobe unit 30 lies above the spool chamber unit 5 beyond the space 28 (See FIG. 2) in the direction of arrow Z shown in FIGS. 3 and 4, that is, lies on the front side of the camera. In the space 28, the data projecting unit and picture size switching mechanism are placed. FIGS. 3 and 4 show a state in which the strobe unit 30 is stowed within the housing members 16.

Furthermore, on the bottoms of the lens barrel unit 23 and spool chamber unit 5, there is a drive unit 34 for driving the film feed and lens barrel unit. The drive unit 34 is connected to the driving motor 27 in the spool 26.

On the top of the lens barrel unit 23, a viewfinder unit 35 is located as shown in FIGS. 5 and 6. The external handling member 45 is located near a viewfinder eyepiece (not shown particularly) on the back of the viewfinder unit 35 and by the side of the spool chamber unit 5. The external handling member 45 can be turned freely within a given range.

The work lever 46 is fastened to the external handling member 45 as an integral part of the external handling member 45 with a screw 4k (See FIGS. 3 and 4) inside the inner wall of the front housing member 16a. The external handling member 45 and work lever 46 are thus interlocked with each other. As mentioned above, the work shaft 46a embedded in the distal part of one arm of the work lever 46 is clamped by the arm member 10c of the holding member 10. The external handling member 45 and work lever 46 are always constrained to move by means of a constraining means (not shown) such as a toggle spring. This is intended to retain the upper light intercepting plate 12 and lower light intercepting plate 13 at the positions shown in FIGS. 3 and 5. At this time, the holding member 10 is held at a position at which it abuts on a stopper 8f.

Moreover, the picture size detection switch 15 is placed in a space defined by the lens barrel 23, viewfinder unit 35, data projecting unit, and picture size switching mechanism. A picture size detection switch pattern 29b formed as an integral part of the FPC 29 is located in a space shaped substantially like the letter L (i.e., is L-shaped) and opposed to the picture size detection switch 15 inside the holding member 10. The picture size detection switch 15 is located at a position at which when it is set to designate the panoramic picture size (FIG. 6), a contact thereof will not meet the pattern 29b.

Moreover, when the picture size detection switch 15 is set to designate the normal picture size (state shown in FIG. 5), the switch is located at a position at which the contact thereof meets the pattern 29b. At this time, the upper light intercepting plate 12 that moves together with the holding member 10 withdraws from the photographic aperture 6a. A driving force is conveyed to the lower light intercepting plate holding member 14 via the rack 10a and pinion gear 9. The lower light intercepting plate 13 is also located at a position at which it has withdrawn from the photographic aperture 6a. Incidentally, the upper and lower light intercepting plates 12 and 13 are formed with thin plate-like members that are light-interceptive.

In the data projecting unit, a light beam emanating from the LED 29a passes through the holding member 10 and falls on the prism 11. The light path is bent by the prism 11. The light beam is irradiated to a given position on the film 22 after passing through the opening 6b. For projecting data using the LED 29a, a generally utilized means is adopted. For example, while the film 22 is being wound after exposure for photography is completed, data is projected sequentially in units of one character.

Figure 7:
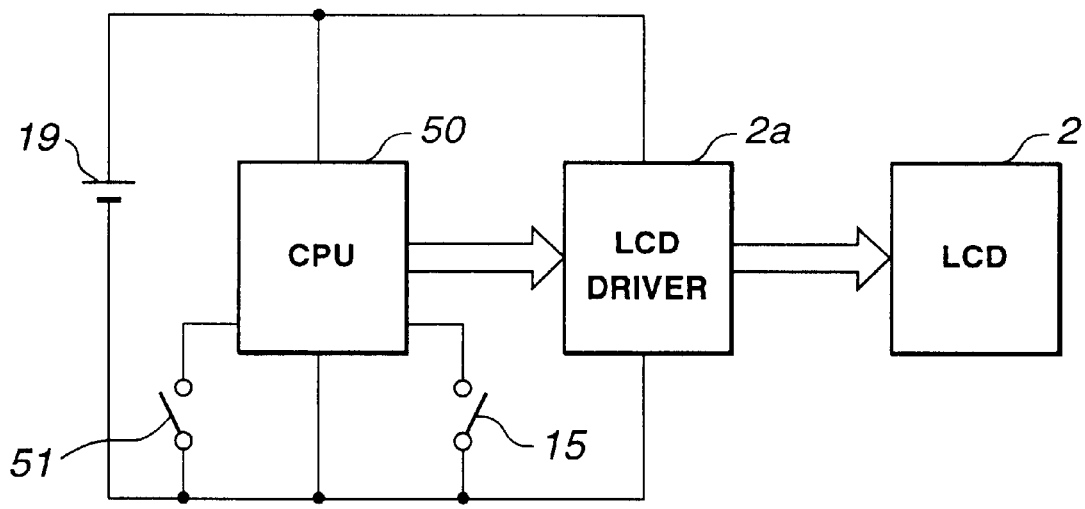
FIG. 7 is an electric circuit diagram showing an LCD drive circuit for driving an LCD that defines a viewfinder picture zone in the camera shown in FIG. 1.

Moreover, the LCD drive circuit has the circuitry shown in FIG. 7. FIG. 7 is an electric circuit diagram briefly showing the LCD drive circuit in the LCD 2 for defining a viewfinder picture zone in the camera of this embodiment.

As shown in FIG. 7, the LCD drive circuit consists of a CPU 50, the LCD 2, a main power switch 51, the supply battery 19, and the picture size detection switch 15. The CPU 50 is a control means for controlling the entire camera. The LCD 2 is electrically connected to the CPU 50 via an LCD driver 2a.

The CPU 50 detects the on or off state of the picture size detection switch 15. Based on the result of detection, various signals are output to the LCD 2 via the LCD driver 2a. The LCD 2 is then brought to a driven or non-driven state. Consequently, a given viewfinder picture zone is selected.

Figure 8:
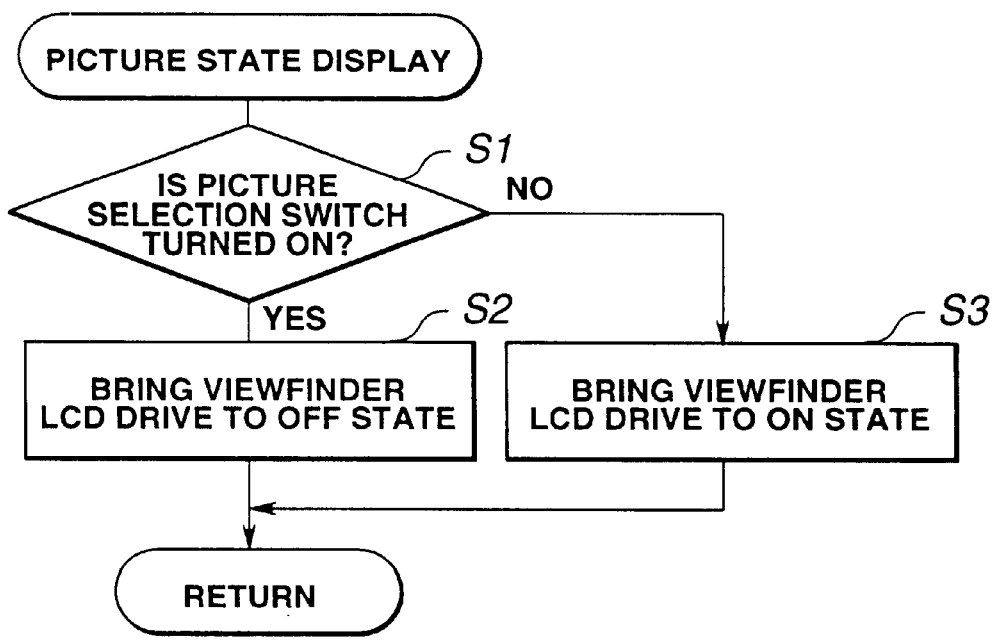
FIG. 8 is a flowchart describing an operation for switching viewfinder picture sizes using the LCD drive circuit shown in FIG. 7.

An operation for switching the size of a viewfinder picture zone to another to be performed by the LCD drive circuit having the foregoing components will be described briefly in conjunction with the flowchart of FIG. 8.

Control is passed from a main control routine (not shown) to be performed in the camera to a picture size switching subroutine (FIG. 8) for switching the size of a viewfinder picture zone to another. First, at step S1, the CPU 50 detects if the picture size detection switch 15 is turned on. If it is confirmed that the switch 15 is on, it is judged that the size of the viewfinder picture zone instructed by the switch 15 is a large size (for example, a normal picture size). Control is then passed to the processing of step S2. At step S2, a signal for setting the driven controlled state of the LCD 2 to an off state is output to the LCD driver 2a. The subroutine is then terminated (control is returned). The LCD 2 is then brought to an entirely transparent state. The viewfinder picture zone is set to the normal picture size.

On the other hand, if it is confirmed at step S1 that the switch 15 is off, it is judged that the size of the viewfinder picture zone instructed by the switch 15 is a small size (for example, a panoramic picture size attained by blocking the upper and lower parts of the LCD). Control is then passed to the processing of step S3. At step S3, a signal for setting the driven and controlled state of the LCD 2 to an on state is output to the LCD driver 2a. The LCD 2 is duly driven. The panoramic size to be attained by blocking parts of the viewfinder picture zone is designated. Thereafter, the subroutine is terminated (control is returned).

Next, movements to be made by the data projecting unit and picture size switching mechanism will be described.

First, assume that the data projecting unit and picture size switching mechanism switch the state (FIGS. 3 and 5) of the photographic aperture 6a associated with the normal picture size to the state associated with the panoramic picture size shown in FIGS. 4 and 6. In this case, the external handling member 45 is handled.

Specifically, the external handling member 45 is turned in a given direction in order to designate the panoramic picture size. The work lever 46 is interlocked with the external handling member 45 and turned in the same direction. The work shaft 46a of the work lever 46 presses down the holding member 10 in the direction of arrow Y2. The holding member 10 abuts on the stopper 8f and stays there. At this time, the holding member 10 is pressed down to slide in the direction of arrow Y2. This causes the lower light intercepting plate holding member 14 to slide in the direction of arrow Y1 due to the mesh among the rack 10a, pinion gear 9, and rack 14a. The light intercepting plates 12 and 13 move to positions at which they block parts of the photographic aperture 6a along the upper edge and lower edge thereof. Consequently, the photographic aperture 6a, that is, a photographic picture zone is set to the panoramic picture size. At this time, the pattern 29b recedes from the picture size detection switch 15. In response to a detection signal sent from the switch 15, the LCD 2 depicts a scene according to the panoramic picture size. The viewfinder field of view is also set to the panoramic picture size.

On the other hand, for switching the state shown in FIGS. 4 and 6 (panoramic picture size) to the state shown in FIGS. 3 and 5 (normal picture size), the external handling member 45 is turned in a given direction (direction opposite to the above direction) in order to designate the normal picture size. The work shaft 46a of the work lever 46 that is interlocked with the external handling member 45 presses up the holding member 10 in the direction of arrow Y1. The holding member 10 is retained at a position at which it abuts on the stopper 8f. At this time, the lower light intercepting plate holding member 14 slides in the direction of arrow Y2. The light intercepting plates 12 and 13 move to positions at which they have withdrawn from the photographic aperture 6a. Consequently, the photographic aperture 6a, that is, the photographic picture zone is set to the normal picture size. At this time, the pattern 29b meets the picture size detection switch 15. In response to a detection signal sent from the switch 15, the LCD 2 depicts a scene according to the normal picture size. The viewfinder field of view is also set to the normal picture size.

Herein, the timing of moving the light intercepting plates 12 and 13 and the timing of moving the LCD 2 that is a viewfinder light intercepting member for defining a viewfinder field of view will be described below in conjunction with the timing chart of FIG. 9.

The light intercepting plates 12 and 13 are, as mentioned above, switched from the state, in which they have withdrawn from the photographic aperture 6a, to the state in which they are blocking parts of the photographic aperture 6a. In the viewfinder unit, the LCD 2 switches the viewfinder field of view associated with the normal picture size (hereinafter, normal viewfinder picture zone) to the one associated with the panoramic picture size (hereinafter, panoramic viewfinder picture zone). The timing of switching the photographic picture zones or viewfinder picture zones is as indicated in FIG. 9.

Specifically, in FIG. 9, the range (position) in which the external handling member 45 is turned is indicated on the axis of abscissae. A displacement of the photographic picture zone defined by the photographic aperture 6a (in the camera body) is plotted as an upper straight line. A displacement of the viewfinder field of view is plotted as a lower polygonal line. The movements to be made for the displacements are completed with the external handling member positioned at points plotted as both ends of the axis of abscissae. Moreover, a neutral point that is substantially a middle position in the range within which the external handling member 45 is moved is indicated with a dot-dash line.

As illustrated, first, assume that the external handling member 45 is handled in order to switch the normal picture size (normal size or full size) to the panoramic picture size. This causes the photographic aperture 6a to diminish gradually due to the movements of the light intercepting plates 12 and 13 for intercepting light (an area in which light is intercepted increases). Consequently, the photographic picture zone is set to the panoramic size. In other words, an apparent switching point to which the external handling member is moved for switching the normal picture size to the panoramic picture size does not exist in terms of the photographic aperture 6a (photographic picture zone in the camera body).

On the other hand, when the external handling member is moved to a switching point A, the normal viewfinder picture zone for displaying a picture in the normal picture size is switched to the panoramic viewfinder picture zone. The switching point A is located near a point, to which the external handling member is moved for designating the normal picture size, beyond the neutral point C of the external handling member 45.

As described above, according to the first embodiment, the component units composed of the simple-shape component members should merely be assembled and screwed to construct the camera body. This contributes to improvement of productivity. The members can be used in common. For example, a model change can be coped with readily. Specifically, when the gap between a spool chamber and Patrone chamber must be changed due to a model change, the designs of the linking member 6, linkage reinforcing member 3, and lower linking member (not shown) should merely be modified.

Moreover, the linking member 6, linkage reinforcing member 3, and lower linking member are formed with simple members shaped substantially like flat plates. This contributes to improvement of productivity of a part unit. Besides, it contributes to reduction in cost of manufacturing.

The linkage reinforcing member 3 and lower linking member are integrated into the camera body. Rigidity can be ensured for the whole camera body. Besides, the camera body can be structured so that any internal mechanism will be hardly affected by an extraneous force.

Furthermore, a photographic optical system can be checked or adjusted with the lens barrel unit 23, which has the photographic lens 24 held therein, fixed to the linking member 6. This is advantageous in terms of quality guarantee or transportation.

On the other hand, the switching point A is located near a point, to which the external handling member is moved for setting the photographic aperture 6a in the camera body to the normal picture size (full size), beyond the neutral point (middle point) of the external handling member 45. Herein, the switching point A is a point to which the external handling member is moved for switching the size of the viewfinder picture zone to another size. For example, the movement of the external handling member 45 may be stopped halfway. Nevertheless, the viewfinder picture zone is set to the panoramic picture size. In this state, the photographic aperture 6a may be brought to an intermediate state by means of the light intercepting plates 12 and 13. Namely, the photographic aperture 6a is set to neither the normal picture size nor the panoramic picture size. However, as mentioned above, the viewfinder picture zone is set to the panoramic picture size. An object image within a range intended by a photographer, that is, a range defined as the photographic picture zone of the panoramic size can be exposed and projected on a film reliably. A failure in photography that an object within a range intended by a photographer is not photographed can be avoided.

In this embodiment, the picture size detection switch 15 is made stationary. The pattern 29b formed on the holding member 10 is brought into contact with or receded from the switch 15. When the normal picture size is designated, the switch 15 is thus turned on. The present invention is not limited to this mode. Alternatively, the holding member 10 may be provided with the switch 15 and pattern 29b. A contact of the switch 15 may abut on the pattern 29b all the time. This structure permits arbitrary adjustment of the switching point A to which the external handling lever is moved for switching the size of the viewfinder field of view to another.

Another means detects, for example, a range (position) or direction within or in which the work lever 46 is turned. Otherwise, the timing of switching the states of the holding member 10 or of the light intercepting plates 12 and 13 may be detected directly using a sensing means such as a photoreflector (PR). The size of the viewfinder field of view may then be switched to another according to the result of detection.

Next, a camera of the second embodiment of the present invention will be described in conjunction with FIGS. 10 and 11. The camera of this embodiment has fundamentally the same components as that of the first embodiment. In this embodiment, however, switching the size of the viewfinder field of view to another is achieved mechanically. The same reference numerals will be assigned to component members identical to those of the first embodiment. The description of the component members will be omitted.

Figure 10:
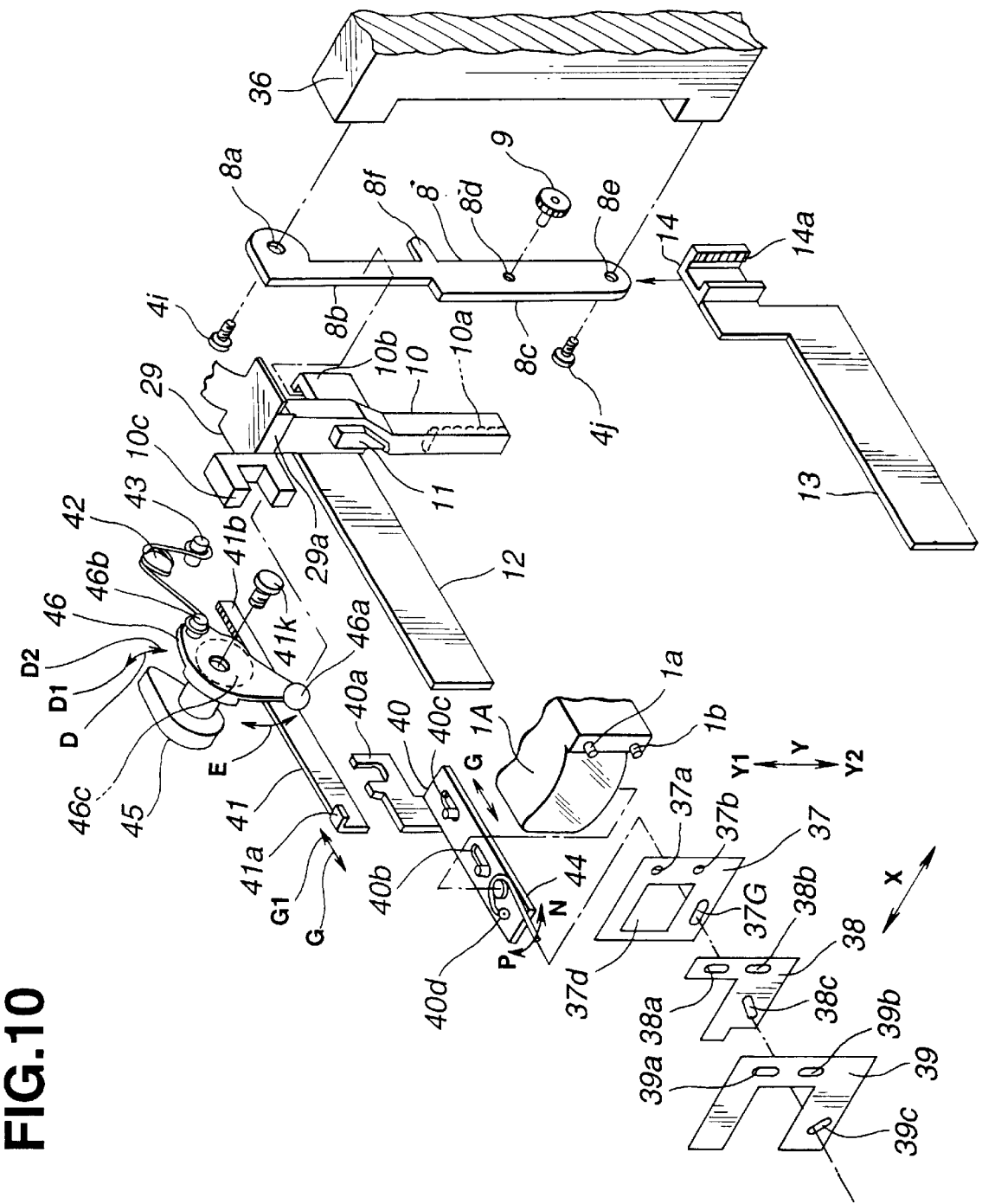
FIG. 10 is an exploded oblique view showing the major portions of a data projecting unit and picture size switching mechanism employed in a camera of the second embodiment of the present invention.

FIG. 10 is an exploded oblique view of major portions of a data projecting unit and picture size switching mechanism adopted in this camera.

As shown in FIG. 10, a data projecting unit in the camera of this embodiment is, similar to that of the first embodiment (See FIG. 1), realized with the holding member 10 and others. The data projecting unit is secured by tightening screws 4i and 4j. The screws 4i and 4j are inserted from the back of the camera into screw holes, which are bored in a camera body locking member 36, via the through holes 8a and 8e. The through holes 8a and 8e are bored at the upper and lower ends of the guide plate 8.

On the other hand, the picture size switching mechanism has components described below. The external handling member 45 is, similar to that in the first embodiment, fastened to the work lever 46 by a screw 41k while engaged therewith. At this time, the external handling member 45 is fastened so that it can rotate freely as an integral part of the work lever 46. The work shaft 46a located at the distal end of one arm of the work lever 46 is fitted in the arm member 10c of the holding member 10 which is shaped like a channel. The movable end of the toggle spring 42 is engaged with the distal end 46b of the other arm of the work lever 46. The stationary end of the spring 42 is engaged with a locking member 43 on the internal wall surface of the housing member (not shown) of the camera. Owing to a constraining force exerted by the spring 42, the work lever 46 is always constrained to move counterclockwise in FIG. 10.

Moreover, an external gear 46c is formed on the inner wall surface of the work lever 46 opposed to the external handling member 45. The gear 46c is meshed with a rack 41b of a second linking member 41 formed with a plate-like member. The second linking member 41 can slide freely in the direction of arrow G. A claw 41a formed at one end of the second linking member 41 is engaged with a notch 40a that is shaped like the letter U (i.e., is U-shaped) at the tip of an arm extending from one arm of a first linking member 40.

The first linking member 40 has elongated holes 40b and 40c bored therein. Two guide axes 35a formed on a stationary portion of the viewfinder unit 35 (not shown in FIG. 10. See FIGS. 5 and 6) are fitted in the elongated holes 40b and 40c. Thus, the first linking member 40 is guided to slide freely in the direction of arrow G.

Moreover, a stationary end 40d of a light intercepting spring 44 is secured to the other end of the first linking member 40. The light intercepting spring 44 causes a viewfinder field frame member 37, a lower light intercepting plate 38, and an upper light intercepting plate 39 (which will be described later) to move in given directions. The viewfinder field frame member 37, lower light intercepting plate 38, and upper light intercepting plate 39 serve as viewfinder light intercepting members and movable mask members. Moreover, the movable end of the spring 44 is passed successively through holes 37c, 38c, and 39c that are bored on the lower edges of the viewfinder field frame member 37, and lower and upper light intercepting plates 38 and 39 respectively. The light intercepting spring 44 is pivoted by a boss (not shown), which is embedded downward in the bottom of a viewfinder prism 1A, so that it can pivot freely.

The viewfinder field frame member 37, and lower and upper light intercepting plates 38 and 39 are thin plate-like members that are light-interceptive. They are stacked up and supported by two axes 1a and 1b jutting out from one side of the viewfinder prism 1A outside an effective range thereof.

The viewfinder field frame member 37 is a member for defining a whole view range (whole viewfinder field of view) permissible by the viewfinder. The viewfinder field frame member 37 is fixed to the face of the viewfinder prism 1A. The viewfinder field frame member 37 has a hole, which matches the photographic picture zone of the normal picture size (full size), bored substantially in the center thereof. As mentioned above, the elongated hole 37c is bored on the lower edge of the viewfinder field frame member 37. The movable end of the light intercepting spring 44 is passed through the elongated hole 37c that is longer in the direction of a long side of a picture frame (in the direction of arrow X in FIG. 10). Holes 37a and 37b are bored on one side of the viewfinder light intercepting member 37. The axes 1a and 1b of the viewfinder prism 1A are passed through the holes 37a and 37b.

Moreover, the lower light intercepting plate 38 is a member for blocking the lower given part of the viewfinder field of view defined by the viewfinder field frame member 37. Moreover, the lower light intercepting plate 38 cooperates with the upper light intercepting plate 39, which will be described later, in matching the viewfinder field of view with the photographic picture zone of the panoramic size. The lower light intercepting plate 38 is stacked on the face of the viewfinder field frame member 37. As mentioned above, the cam hole 38c is bored at a given angle on the lower edge of the lower light intercepting plate 38. The movable end of the light intercepting spring 44 is passed through the hole 38c. Moreover, elongated holes 38a and 38b are bored in the direction of a short side of a picture frame (the direction of arrow Y in FIG. 10) on one side of the lower light intercepting plate 38. The axes 1a and 1b of the viewfinder prism 1A are passed through the elongated holes 38a and 38b.

The upper light intercepting plate 39 is a member for blocking the upper given part of the viewfinder field of view defined by the viewfinder field frame member 37. The upper light intercepting plate 39 cooperates with the lower light intercepting plate 38 in matching the viewfinder field of view with the photographic picture zone of the normal picture size. The upper light intercepting plate 39 is stacked on the face of the lower light intercepting plate 38. Moreover, as mentioned above, the cam hole 39c is bored at a given angle on the lower edge of the upper light intercepting plate 39. The movable end of the light intercepting spring 44 is passed through the cam hole 39c. Besides, elongated holes 39a and 39b that are elongated in the direction of a short side of a picture frame (the direction of arrow Y in FIG. 10) are bored on one side of the upper light intercepting plate 39. The axes 1a and 1b of the viewfinder prism 1A are passed through the elongated holes 39a and 39b.

The movements made by the data projecting unit and picture size switching mechanism which are formed by uniting component members will be described below.

The external handling member 45 is turned in a given direction (direction of arrow D). The size of the photographic aperture 6a (photographic picture zone) and that of the viewfinder field of view (viewfinder picture zone) can thus be switched to other sizes.

When the external handling member 45 is turned in the direction of arrow D1, the movements to be made for switching the normal picture size to the panoramic picture size are started. The work lever 46 is turned in the same direction along with the turn of the external handling member 45. This causes the holding member 10 to move in the direction of arrow Y2. The holding member 10 is abutted on the stopper 8f of the guide plate 8 and thus positioned. At this time, the upper light intercepting plate 12 moves together with the holding member 10 in the same direction. The lower light intercepting plate holding member 14 moves in the direction of arrow Y1 due to the mesh among the rack 10a, pinion gear 9, and rack 14a. Consequently, the photographic aperture 6a is partly blocked. The size of the photographic aperture 6a is regarded as the panoramic picture size.

Meanwhile, since the gear 46c meshes with the rack 41b, the turn of the lever 46 causes the first and second linking members 40 and 41 to slide in the direction of arrow G1. This causes the movable end of the light intercepting spring 44 to pivot in the direction of arrow P with the boss (not shown) of the viewfinder prism 1A as a center. The lower light intercepting plate 38 moves in the direction of arrow Y1, while the upper light intercepting plate 39 moves in the direction of arrow Y2. Consequently, the viewfinder field of view is matched with the panoramic picture zone.

On the other hand, when the external handling member 45 is turned in the direction of arrow D2, the movements to be made for switching the panoramic picture size to the normal picture size are started. This causes the holding member 10 to move in the direction of arrow Y1. The upper light intercepting plate 12 moves in the same direction. The lower light intercepting plate holding member 14 moves in the direction of arrow Y2. The size of the photographic aperture 6a is regarded as the normal picture size.

Meanwhile, the turn of the lever 46 causes the first and second linking members 40 and 41 to slide in the direction of arrow G2. This causes the movable end of the light intercepting spring 44 to pivot in the direction of arrow N. The lower light intercepting plate 38 moves in the direction of arrow Y2, while the upper light intercepting plate 39 moves in the direction of arrow Y1. The upper light intercepting plate 39 thus withdraws from a field frame 37d of the viewfinder field frame member 37. Consequently, the viewfinder field of view is matched with the normal picture zone.

FIG. 11 is a timing chart indicating the timing of the movements to be made for switching the sizes of the photographic picture zone and viewfinder picture zone to another size. The timing chart resembles the one shown in FIG. 9, which has been described in relation to the first embodiment. In this embodiment, a displacement to be made to change the size of the photographic aperture 6a is plotted as a straight line having a small inclination similar to that in the first embodiment. In other words, the external handling member 45 is displaced gradually. A displacement to be made to change the size of the viewfinder field of view is, as shown in FIG. 11, plotted as a polygonal line. Namely, the external handling member 45 is displaced gradually between a first switching point A1 and a second switching point A2. In other words, the external handling member 45 is displaced gradually from the start of turning the external handling member 45 to the completion of moving the upper and lower light intercepting plates 38 and 39. Herein, the upper and lower light intercepting plates 38 and 39 are interlocked with the external handling member 45. The first and second switching points A1 and A2 are located near a point, to which the external handling member 45 is moved for attaining the normal picture size, beyond the neutral point C of the external handling member 45.

Incidentally, the cam holes 38c and 39c bored in the upper and lower light intercepting plates 38 and 39 are used to determine the timing of switching the size of the viewfinder field of view to another size. That is so say, the cam holes 38c and 39c are used to determine the switching points A1 and A2. The timing of switching the size of the viewfinder field of view to another size can therefore be varied arbitrarily by changing the inclinations of the light intercepting plates 38 and 39.

As described so far, according to the second embodiment, switching the size of the viewfinder field of view to another size is achieved mechanically. Nevertheless, the same advantages as those of the first embodiment can be provided.

According to the present invention, it is apparent that a wide range of different embodiments can be constructed based on the invention without a departure from the spirit and scope of the invention. The present invention will be limited by the appended claims but not restricted by any specified embodiments.

What is claimed is:

1. A camera having a picture size switching function, comprising:

a photographic lens barrel unit;

a spool chamber unit forming a spool chamber;

a Patrone chamber unit forming a Patrone chamber;

a linking member composed of a plate-like member having a photographic aperture through which a light beam coming from said lens barrel unit can pass, and guide rail parts that restrict a position of a film relative to said photographic aperture, to which said spool chamber unit and Patrone chamber unit, that are separate and independent from each other, are assembled and integrally joined; and a photographic picture size switching mechanism, mounted at only one location on said linking member to one side of said photographic aperture, including a light intercepting member for blocking at least a portion of said photographic aperture to a desired size, said light intercepting member being arranged to move in a direction perpendicular to a direction of film travel between said spool chamber and said Patrone chamber.

2. A camera having a data projecting function, comprising:

a photographic lens barrel unit;

a spool chamber unit forming a spool chamber;

a Patrone chamber unit forming a Patrone chamber;

a linking member composed of a plate-shaped member having a photographic aperture through which a light beam coming from said lens barrel unit can pass, and guide rail parts that restrict a position of a film relative to said photographic aperture, to which said spool chamber unit and Patrone chamber unit, that are separate and independent from each other, are releaseably assembled and integrally mounted; and a data projecting unit, movably mounted on said linking member and movable in a direction perpendicular to a direction of film travel between said spool chamber unit and said Patrone unit, for realizing a data projecting function for projecting data onto at least two different locations on the film.

3. A camera having a picture size switching function and date projecting function, comprising:

a photographic lens barrel unit;

a spool chamber unit forming a spool chamber;

a Patrone chamber unit forming a Patrone chamber;

a linking member composed of a plate-shaped member having a photographic aperture through which a light beam coming from said lens barrel unit can pass, and guide rail parts that restrict a position of a film relative to said photographic aperture, to which said spool chamber unit and Patrone chamber unit, that are separate and independent from each other, are releaseably assembled and integrally mounted; and a photographic picture size switching mechanism, mounted on said linking member, on a film and a picture size switching function for blocking said photographic aperture to a including a light intercepting member for blocking said photographic aperture to a desired size, said light intercepting member being moveable in a direction perpendicular to a direction of movement of film between said spool chamber unit and said Patrone unit; and a data projecting unit, mounted on said linking member and movable in a direction perpendicular to the direction of film travel, having a data projecting part for projecting data at least two different positions on the film, said data projecting part of said data projecting unit being moveable integrally with said light intercepting member of said photographic picture size switching mechanism.

4. A camera according to claim 3, wherein said data projecting unit includes a holding member being provided integrally on said light intercepting member of said photographic picture size switching mechanism.

5. A camera according to claim 3, wherein said linking member is produced by machining a metallic plate member.

6. A camera according to claim 3, wherein said guide rail parts are formed on one side of said linking member that is a film travel surface, and said photographic picture size switching mechanism and said data projecting unit are mounted on another side thereof opposite to the film travel surface.

7. A camera according to claim 6, wherein said linking member has an opening which is used to project data on to said film by said data projecting unit, which linking member opening is in addition to said photographic aperture.

8. A camera according to claim 4, wherein picture sizes that can be switched by said photographic picture size switching mechanism are a normal size substantially equal to the size of said photographic aperture of said linking member, and a panoramic size attained by blocking upper and lower parts of said photographic aperture by a given amount using said light intercepting member.

9. A camera according to claim 4, wherein said holding member is positioned to be displaced from said photographic aperture, said displacement being in a direction of film travel.

10. A camera having a data projecting function according to claim 2, further comprising:

a holding member supporting said light intercepting member;

a light directing device mounted on said holding member for directing light toward said linking member; and said holding member being movable between first and second positions to move said light directing device and said light intercepting member between said first and second positions.

11. A camera having a picture size switching function and a data projecting function according to claim 10 wherein said light directing device comprises an LED and a prism mounted on said holding member; said prism directing light from said LED toward said linking member.

12. A camera having a picture size switching function according to claim 1 being provided with control knob rotatably mounted to said camera and accessible at a location outside of said camera for changing a position of the light intercepting member responsive to rotation of said control knob.

13. A camera according to claim 3 provided with a control knob rotatably mounted to said camera and accessible at a location outside of said camera for changing a position of the light intercepting member responsive to rotation of said control knob.

14. A camera having a picture size switching function according to claim 1 wherein said intercepting member is comprised of first and second light intercepting plates;

a moveable holding member;

said first plate being joined to move with said holding member;

said holding member and said second plate each having a rack;

a rotatable pinion gear engaging the racks of said holding member and said second plate for moving said second plate in a direction opposite a direction of movement of said first plate.

15. A camera according to claim 3 wherein said intercepting member is comprised of first and second light intercepting plates;

a moveable holding member;

said first plate being joined to move with said holding member;

said holding member and said second plate each having a rack;

a rotatable pinion gear engaging the racks of said holding member and said second plate and being rotated by the rack on said holding member for moving said second plate in a direction opposite a direction of movement of said holding member and said first plate.

* * * * *